United States Patent
Deng et al.

(10) Patent No.: US 10,197,781 B2
(45) Date of Patent: Feb. 5, 2019

(54) VERTICAL CHROMATIC CONFOCAL SCANNING METHOD AND SYSTEM

(71) Applicant: ASM Technology Singapore Pte Ltd, Singapore (SG)

(72) Inventors: Jiangwen Deng, Kwai Chung (HK); Wui Fung Sze, Kwai Chung (HK); Lei Song, Chengdu (CN)

(73) Assignee: ASM TECHNOLOGY SINGAPORE PTE LTD, Singapore (SG)

( * ) Notice: Subject to any disclaimer, the term of this patent is extended or adjusted under 35 U.S.C. 154(b) by 251 days.

(21) Appl. No.: 15/394,358

(22) Filed: Dec. 29, 2016

(65) Prior Publication Data

US 2018/0188515 A1    Jul. 5, 2018

(51) Int. Cl.
*G02B 21/00* (2006.01)
*H04N 9/04* (2006.01)

(52) U.S. Cl.
CPC ....... *G02B 21/0032* (2013.01); *G02B 21/008* (2013.01); *G02B 21/0044* (2013.01); *G02B 21/0064* (2013.01); *H04N 9/045* (2013.01)

(58) Field of Classification Search
CPC ............ G02B 21/0032; G02B 21/0044; G02B 21/0064; G02B 21/008; H04N 9/045
USPC .......................................................... 348/79
See application file for complete search history.

(56) References Cited

U.S. PATENT DOCUMENTS 9,025,245 B2    5/2015   Chen et al.
2010/0188742 A1   7/2010   Chen et al.

*Primary Examiner* — Nguyen T Truong
(74) *Attorney, Agent, or Firm* — Ostrolenk Faber LLP

(57) ABSTRACT

A method of scanning a surface of an object using a confocal imaging system comprises the steps of obtaining first, second and third confocal images of the surface of the object when the object is illuminated respectively by light rays having first, second and third spectral waveforms, and using a camera to capture responsive signals from the object illuminated by the first, second and third spectral waveforms. The first, second and third spectral waveforms are distinguishable from one another and each spectral waveform has overlapping portions relative to another spectral waveform. Thereafter, heights of a plurality of points on the surface of the object corresponding to the plurality of points on each confocal image are determined based on said captured responsive signals.

16 Claims, 5 Drawing Sheets

VERTICAL CHROMATIC CONFOCAL SCANNING METHOD AND SYSTEM

FIELD OF THE INVENTION

The invention relates to a method and system for measuring a surface profile of an object, and in particular to a confocal scanning method and system.

BACKGROUND AND PRIOR ART

The required precision for dimensional measurement is getting higher and higher in semiconductor industries as device sizes are becoming ever smaller. Confocal technology provides a good solution to meet the needs of high-resolution 2D and 3D measurement, among which chromatic confocal technology in particular improves the efficiency of a scanning mechanism for confocal measurement and makes it practicable for real time inspection applications.

In a chromatic confocal system, light rays with different colors are dispersed along an optical axis, so that only a small range of wavelengths can be reflected from an object of interest and then received by an imaging system. The height information can then be determined by analyzing the light spectrum. A spectrum analyzer typically consists of a prism, grating or filters, and intensity sensing devices.

FIG. 1 is a graph showing an exemplary chromatic confocal signal spectrum obtainable from a conventional confocal system. It illustrates a typical chromatic confocal signal which is represented as a spectrum. There is only one peak on the graph indicating that only light that is just in focus can be received by the system, while out-of-focus light from the object surface is eliminated by the pinhole. In the other words, the height of the inspected object surface can be estimated by searching the peak position of the impulse signal or color, wherein the relationship between height and color can be calibrated in advance. In order to determine the entire topography of the object, two-dimensional scanning along the X-Y axes on its surface is required.

To further speed up the chromatic confocal system, a slit may be used instead of a single pinhole point. US Patent Publication number 2010/0188742 entitled "Slit-Scan Multi-Wavelength Confocal Lens Module and Slit-Scan Microscopic System and Method Using the Same" discloses a chromatic or multi-wavelength slit-based scanning system. However, in such a system, the cross-talk effect can be severe as unfocused light may diffuse and spread to neighboring pixels along a direction of the slit, and lower the system's accuracy for depth detection.

U.S. Pat. No. 9,025,245 entitled "Chromatic Confocal Microscope System and Signal Process Method of the Same" discloses a confocal system using a pair of optical fiber modules to modulate a linear or a planar detecting light. It describes splitting the detecting light by passing the light through respective color filters into two different image sensing units. This generates two RGB images, with which the depth or surface profile of the object of interest can be reconstructed according to the ratio of intensity of these two images. One critical drawback of such a system is that merely computing height information from the maximum intensity ratio lacks accuracy since some stray or unfocused light rays can also enter the system causing some intensity offsets and hence altering the ratio of color intensity.

Therefore, it is desirable to improve the accuracy of the light color ratio computation by modulating the spectrum of a light source.

SUMMARY OF THE INVENTION

It is thus an object of the invention to seek to provide a confocal scanning method and system which allows the inspection of an area of an object for each image captured while enhancing height resolution in the image, and which aids an increase in scanning speed as compared to the prior art.

According to a first aspect of the invention, there is provided a method of scanning a surface of an object using a confocal imaging system, comprising the steps of: obtaining first, second and third confocal images of the surface of the object when the object is illuminated respectively by light rays having first, second and third spectral waveforms; using a camera to capture responsive signals from the object illuminated by the first, second and third spectral waveforms; and thereafter determining heights of a plurality of points on the surface of the object corresponding to the plurality of points on each confocal image based on said captured responsive signals; wherein the first, second and third spectral waveforms are distinguishable from one another and each spectral waveform has overlapping portions relative to another spectral waveform.

According to a second aspect of the invention, there is provided a confocal imaging system for scanning a surface of an object, comprising: first, second and third lighting assemblies operative to produce light rays having first, second and third spectral waveforms for illuminating the object; a camera for capturing first, second and third confocal images of the surface of the object that are indicative of responsive signals from the surface of the object when the object is illuminated respectively by the light rays having the first, second and third spectral waveforms; a processor for determining the heights of a plurality of points on the surface of the object corresponding to the plurality of points on each confocal image based on said captured responsive signals; wherein the first, second and third spectral waveforms are distinguishable from one another and each spectral waveform has overlapping portions relative to another spectral waveform.

According to a third aspect of the invention, there is provided a confocal imaging system for scanning a surface of an object, comprising: a modulating filter assembly operative to modulate light rays generated from a light source to produce light rays having first, second and third spectral waveforms for illuminating the object; a camera for capturing first, second and third confocal images of the surface of the object that are indicative of responsive signals from the surface of the object when the object is illuminated respectively by the light rays having the first, second and third spectral waveforms; a processor for determining the heights of a plurality of points on the surface of the object corresponding to the plurality of points on each confocal image based on said captured responsive signals; wherein the first, second and third spectral waveforms are distinguishable from one another and each spectral waveform has overlapping portions relative to another spectral waveform.

It would be convenient hereinafter to describe the invention in greater detail by reference to the accompanying drawings which illustrate a specific preferred embodiment of the invention. The particularity of the drawings and the related description is not to be understood as superseding the generality of the broad identification of the invention as defined by the claims.

BRIEF DESCRIPTION OF THE DRAWINGS

An example of a chromatic confocal scanning method and system in accordance with the invention will now be described with reference to the accompanying drawings, in which.

DETAILED DESCRIPTION OF THE PREFERRED EMBODIMENT OF THE INVENTION

Figure 1:
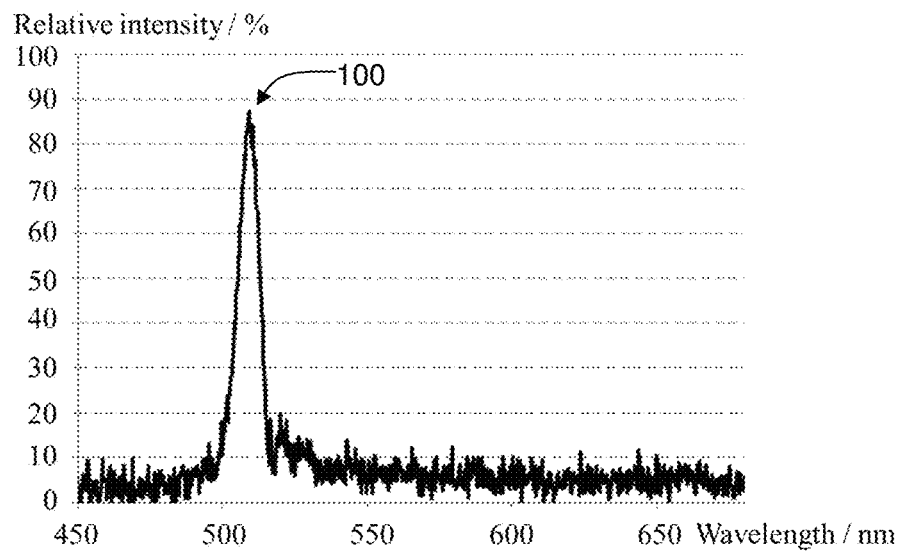
FIG. 1 is a graph showing an exemplary chromatic confocal signal spectrum obtainable from a conventional confocal system.
Figure 2:
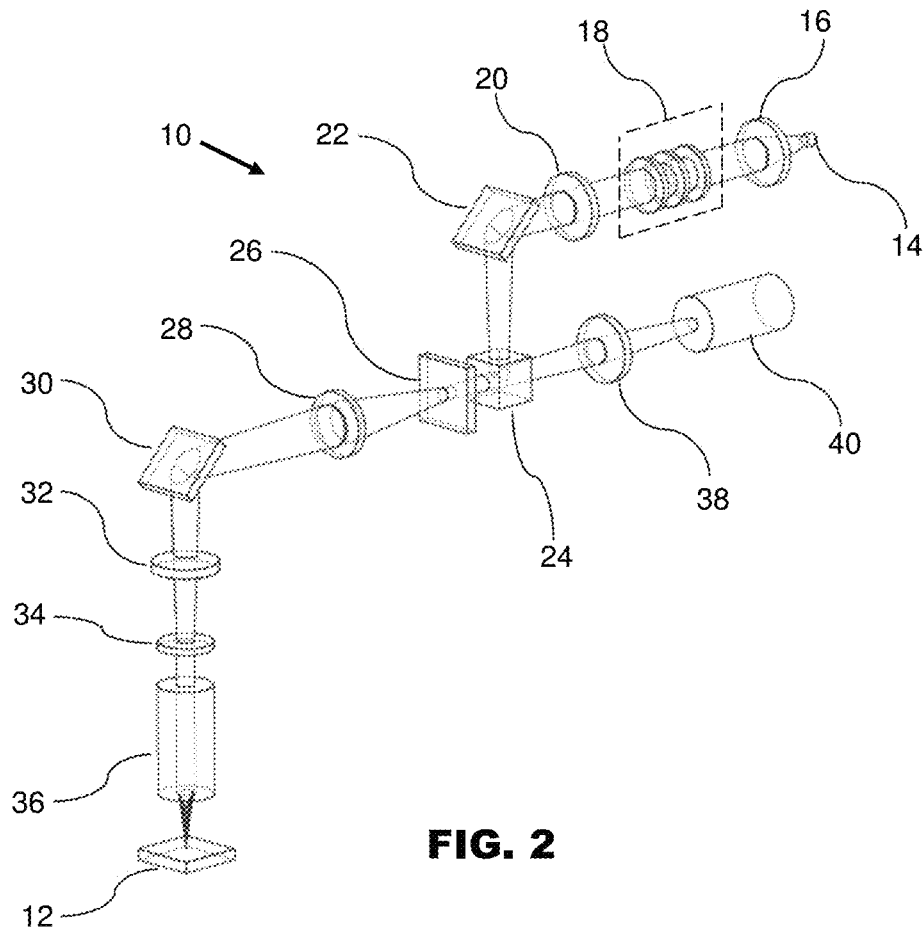
FIG. 2 illustrates the chromatic confocal system comprising a modulated light source according to the preferred embodiment of the invention.

FIG. 2 illustrates a confocal imaging system or chromatic confocal system 10 comprising a modulated light source according to the preferred embodiment of the invention, which is used for measuring a surface profile of an object 12. The chromatic confocal system 10 comprises a light source 14 which generates light rays that are passed through a condenser lens 16, followed by a modulating filter assembly, such as a Lyot filter 18. In this embodiment, the spectrum of light rays is modulated by the Lyot filter into a sinusoidal form of light rays (see, for example, FIG. 6). The modulated light rays are then passed through a Fresnel lens 20 and reflected by a first mirror 22 towards a polarizing beam splitter 24.

The polarizing beam splitter 24 directs the light rays through a pinhole array 26 comprising a pinhole plate having an array of pinholes, and a tube lens 28 onto a second mirror 30, which reflects the light rays through a chromatic element 32, a quarter-wavelength waveplate 34 and an objective lens 36, which focuses the light rays onto the object 12. The chromatic confocal system 10 is different from conventional chromatic confocal systems in that a pinhole array pattern instead of a single pinhole is fabricated on the pinhole plate. The polarizing beam splitter 24 and the quarter-wavelength waveplate 34 function to suppress internal stray light rays on the surfaces of the various lenses.

Light rays that are reflected off the object 12 are directed back through the objective lens 36, quarter-wavelength waveplate 34, chromatic element 32, second mirror 30 and tube lens 28 and pinhole array 26 towards the polarizing beam splitter 24. Such received light rays are passed through the polarizing beam splitter 24 through an imaging lens 38, and the resultant image is imaged by a color camera 40. Thus, it is notable that the confocal signal which is in the form of a dense two-dimensional color image is detectable by a color camera 40 in combination with scanning with a pinhole array 26, instead of a spectrometer as used in the prior art. The chromatic confocal system 10 is thus more cost-effective.

Figure 3:
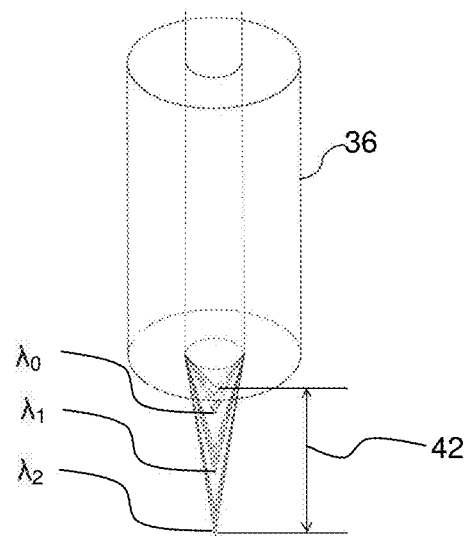
FIG. 3 illustrates the chromatic confocal system dispersing different colors of light along its optical axis.

FIG. 3 illustrates the chromatic confocal system 10 dispersing different colors of light along its optical axis. Such dispersal occurs because different colors of the light rays are focused at different height levels by the objective lens 36 of the chromatic confocal system 10. A vertically-distributed pattern is generated for the purpose of imaging, such as by suppressing some wavelengths of the light rays with the Lyot filter 18.

According to the preferred embodiment of the invention, at least three confocal images are captured per period in the color spectral waveform while the object 12 is being illuminated by light rays having respective first, second and third spectral waveforms, in order to resolve height information at respective positions. An intensity of each pixel on a confocal image consists of three components, namely: background intensity (due to stray or out-of focus light), the reflectivity of the object being inspected and information on the depth at that position.

Figure 6:
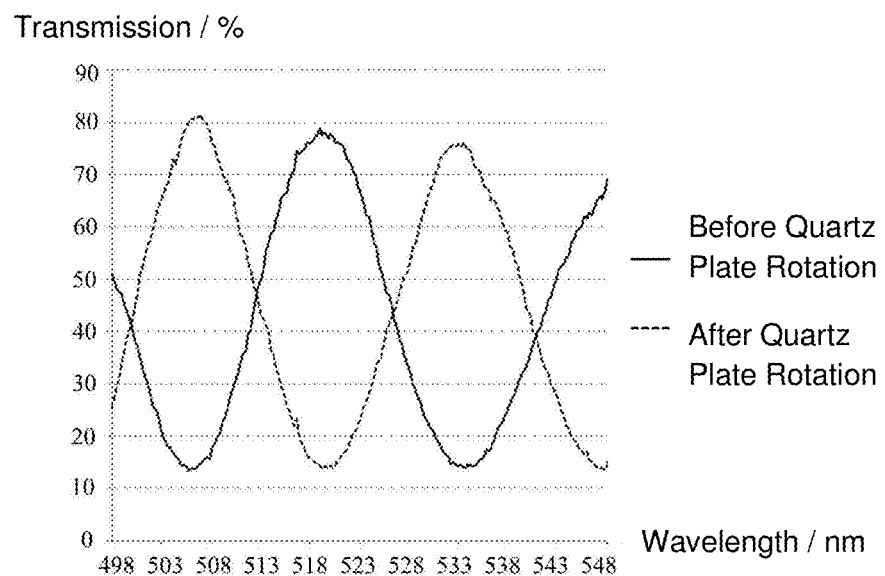
FIG. 6 is a graph showing a transmission spectrum of a single-stage Lyot filter at two different rotation angles of the Lyot filter.

Each of the at least three spectral waveforms is distinguishable from one another, but has overlapping portions with respect to one another (see for instance the overlapping portions of the two separate spectral waveforms illustrated in FIG. 6). The color camera 40 is used to capture responsive signals from the object 12 illuminated by the at least three distinguishable spectral waveforms. Heights of a plurality of points on the surface of the object 12 can then be determined based on the responsive signals relating to the corresponding plurality of points captured on at least three confocal images. The responsive signals comprise an intensity spectrum of light rays reflected from the surface of the object 12 that are received by the color camera 40.

Before actual measurement, calibration is performed. This may be done with respect to a flat calibration surface. Using this approach, at each calibration height, first, second and third confocal images are captured of the flat calibration surface from various heights of the confocal system relative to the flat surface, and when the flat surface is illuminated by light rays having the first, second and third spectral waveforms respectively. An intensity spectrum is obtained from each of the three confocal images, such that a distinctive calibration intensity ratio is obtained for each calibrated height. A virtual look-up table is then created based on such calibration intensity ratio that is in turn referable to each respective height of the flat calibration surface.

After obtaining three confocal images of the object 12 showing intensity spectrums, the height information can be determined by comparing the intensity variations from the virtual lookup table recording the different height levels that are obtained during calibration. Although the sinusoidal spectrum is repetitive in nature, any ambiguity can be resolved by analyzing the ratios of the intensity response strengths perceptible from RGB channels comprised in the color camera 40.

The following describes three exemplary ways in which multiple images which provide variations in intensity information that is usable for resolving heights are obtainable from the system:

A. Capturing Images Illuminated by Different Light Sources

Figure 4:
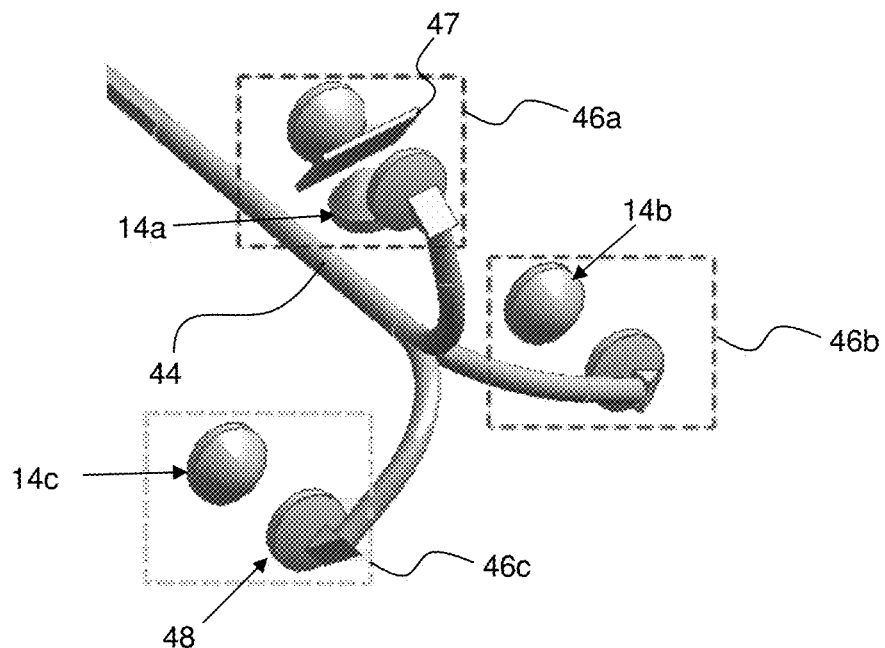
FIG. 4 is a isometric view of a lighting apparatus comprising multiple light sources for generating illumination comprising different waveforms.

FIG. 4 is an isometric view of a lighting apparatus comprising multiple light sources 14 for generating illumination comprising different spectral waveforms. In this embodiment, there are three separate lighting assemblies 46a, 46b, 46c which are connected to a single optical fiber 44. Within each lighting assembly 46a, 46b, 46c, each light source 14a, 14b, 14c is associated with a corresponding light receiver 48 that is connected to the optical fiber 44. The optical fiber 44 will project light rays produced by respective light sources 14 onto the Fresnel lens 20 for onward transmission onto the object 12.

Depending on design requirements, light generated from a light source 14 may be directly transmitted to the light receiver 48, or be reflected by a mirror 47 arranged to reflect light rays from the light source 14 to the light receiver 48. Each light source 14a, 14b, 14c produces light rays having a different spectral waveform, and is operative to sequentially illuminate the object 12 with a different spectral waveform.

B. Capturing Images at Different Height Levels

Using this alternative approach, at least three confocal images of the object are captured from at least three different heights of the chromatic confocal system 10 relative to the object 12. To do so, the chromatic confocal system 10 may be raised or lowered with respect to the object 12. Different from a traditional confocal system which scans continuously for a maximum intensity value along a vertical axis, the inspection method according to the preferred embodiment of the invention seeks to obtain samples from the patterned spectrum without such vertical scanning. By capturing images from at least three different heights, different spectral waveforms are generated onto the object 12 using the same light source 14 such that heights of a plurality of points on the surface of the object 12 are resolvable by detecting the light intensity response strength ratio produced by the spectral waveforms generated by the light source 14 at the respective heights.

Hence, owing to the chromatic effect, the sampling interval of the invented apparatus can be much larger than that of a traditional confocal system, and therefore a faster measurement speed can be attained.

C. Rotating the Lyot Filter to Shift the Modulated Spectrum

Another scanning approach for resolving the heights on a plurality of points on the object 12 is by shifting or changing the light spectrum distribution from the light source 14 at least three times to capture at least three confocal images. Using this approach, the first, second and third spectral waveforms are generated by modulating the light rays produced by the light source 14 to produce the respective spectral waveforms. The set-up of a chromatic confocal system 10 which incorporates a modulating filter assembly in the form of a Lyot filter has been described in detail with respect to FIG. 2.

Figure 5:
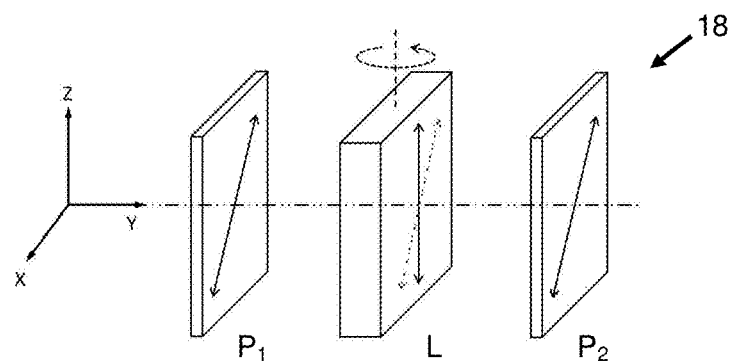
FIG. 5 is a construction diagram of a single-stage Lyot filter.

As depicted in FIG. 5, a single-stage Lyot filter 18 comprises two linear polarizers P1, P2 and one quartz plate L. An optical axis of the quartz plate L is parallel to the Z or vertical axis on the plane of the quartz plate. Polarization directions of the linear polarizers P1 and P2 are at an angle of 45° to the optical axis of the quartz plate L. Input light is linearly polarized by the first polarizer P1 and is then transformed due to the retardance of the quartz plate L, before reaching the second polarizer P2. The degree of rotation of light rays emerging from the Lyot filter 18 arising from polarization depends on the wavelength of the light rays and also the distance travelled through the quartz plate L.

By controlling the rotation of the quartz plate L about the vertical Z axis, the travelling distances for the extraordinary and ordinary light rays are variable, and hence the transmission of the spectrum, can be changed. FIG. 6 shows the transmission rate of a Lyot filter 18 as against different wavelengths at two different rotation angles about the optical axis of the quartz plate L. Before rotation of the quartz plate L, a first graph of the transmission rate is obtained. After rotation of the quartz plate L about the Z axis that is transverse to the travel direction of the light rays through the Lyot filter 18, for example by an angle of 30°, the entire first graph is shifted sideways to form different transmission rates over the same range of wavelengths. Utilizing this property of a Lyot filter 18, the modulation shift of the spectrum can be precisely controlled. Hence, images of the spectrum produced by different light source modulations can be captured for height computation by rotating the quartz plate L to different rotation angles. It should be appreciated that the period of the spectrum can also be controlled by adopting quartz plates L with different retardances, which would also operate to vary the travelling distances for the extraordinary and ordinary light rays accordingly.

The light source 14 in the chromatic confocal system 10 may include, but is not limited to, light emitting diodes (LEDs) including white LEDs, any of a plurality of color LEDs of different wavelengths, or lasers. Light sources such as halogen or arc lights, Xenon lamps with a continuous wide spectrum and which include appropriate spectrum modulation elements can also be used as the light source 14.

Figure 7:
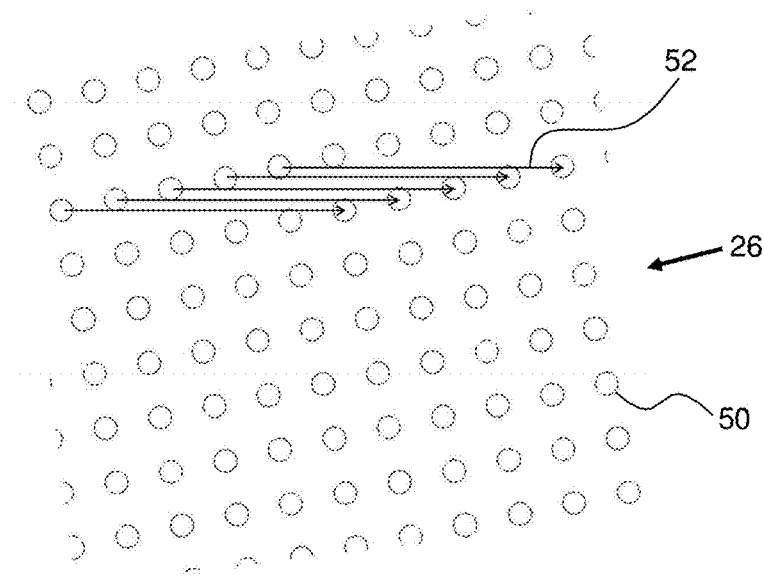
FIG. 7 illustrates a pinhole array scanning operation with the pinhole array rotated at an angle to a direction of motion for imaging.

FIG. 7 illustrates a pinhole array 26 scanning operation with the pinhole array 26 comprising a matrix of individual pinholes 50 rotated at an angle to a direction of motion 52 for confocal imaging. The pinhole array 26 is shifted transversely to a travelling direction of the light rays in the direction of motion 52 during capturing of the confocal images. Using such a pinhole array 26 scanning approach, a dense profile can be achieved by generating a combination of images from the light spectrum rather than a single light point from a single pinhole. Hence, the scanning speed is accelerated.

Figure 8:
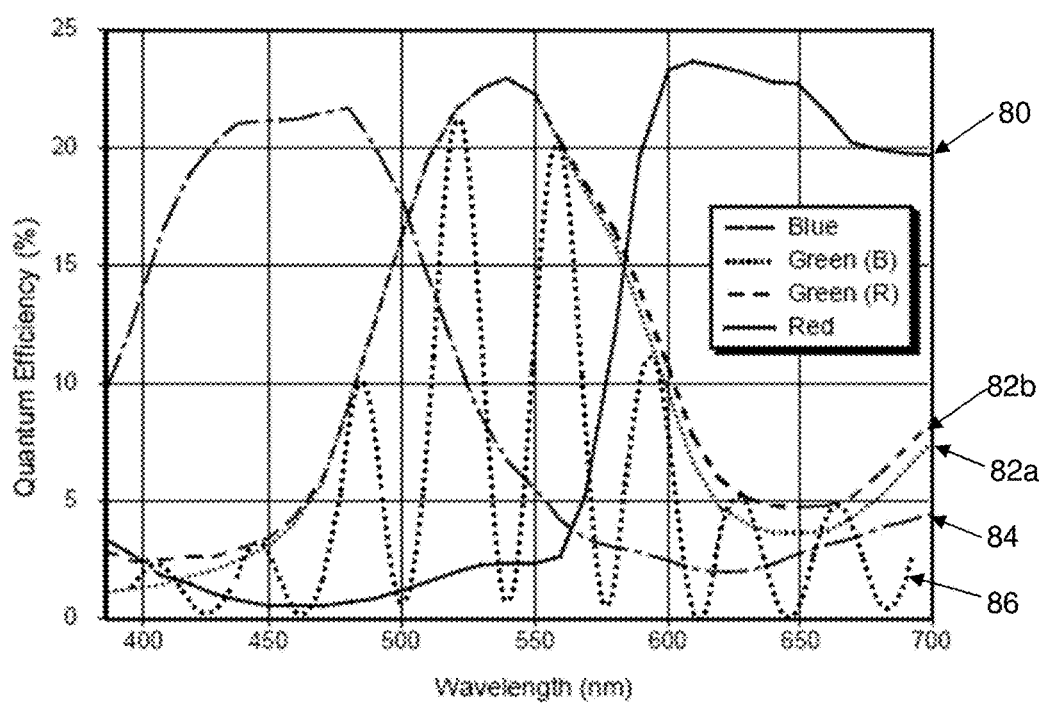
FIG. 8 is a graph showing a spectral response of a sensor of an exemplary color camera wherein its high frequency profile illustrates a varying green channel response at different wavelengths modulated by a Lyot filter.

FIG. 8 is a graph showing a spectral response of a sensor of an exemplary color camera 40 wherein its high frequency profile illustrates a varying green channel response at different wavelengths modulated by a Lyot filter 18. The respective inherent spectral responses of a red channel 80, green channels 82a, 82b and blue channel 84 of the sensor of the color camera 40 in ordinary usage are illustrated. Also illustrated is a modulated spectrum 86 that is obtained by generating a modulated light spectrum distribution according to the preferred embodiment of the invention which is more consistent than the original channel responses of the color camera sensor 40, and the modulated spectrum is used by the preferred embodiments of the invention to determine more precisely a height of a particular point.

It is also notable that the final responses in the sensor of the color camera 40 comprise multiples (in spectrum) of (a) a lighting spectrum distribution (as in FIG. 6), (b) the color of the inspected object 12, (c) the confocal response signal (see FIG. 3), and (d) the camera filter spectrum (see FIG. 8). These responses are relatable to heights on a measured object and allow heights on the object to be accurately determined from the final responses in the sensor of the color camera 40.

Figure 9:
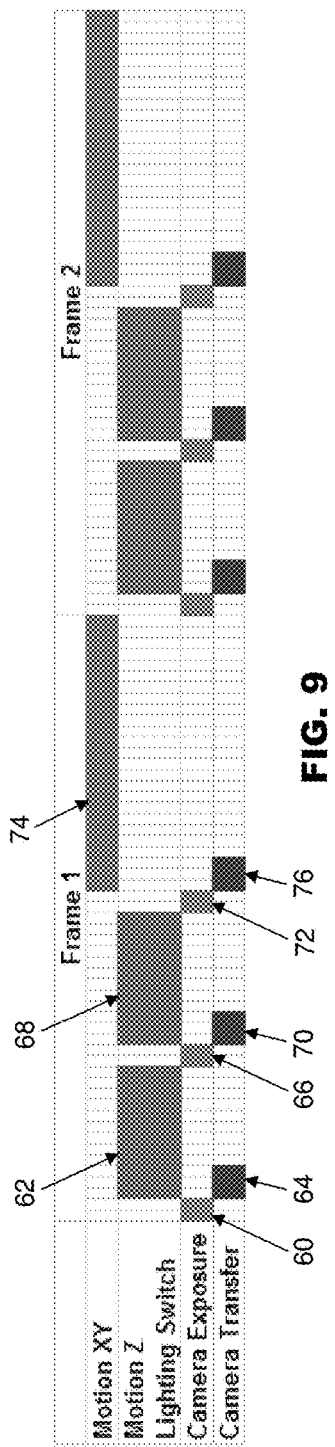
FIG. 9 illustrates an exemplary image grabbing sequence.

FIG. 9 illustrates an exemplary image grabbing sequence which implements the process of scanning the object 12 by capturing confocal images of the object 12 at three different heights of the chromatic confocal system 10 relative to the object. At a first height of the chromatic confocal system 10, an exposure of the color camera 40 is activated 60 and a first image is captured 62 while the rotated pinhole array 26 is shifted along the direction of motion 52 for capturing a confocal image of a contiguous area of the object 12. While the first captured image is being transferred 62 to a processor, the chromatic confocal system 10 moves along the Z axis 64 to a second height. At the second height, the exposure of the color camera 40 is activated 66 and a second image is captured while the pinhole array 26 is shifted along the direction of motion 52. While the second captured image is being transferred 68 to the processor, the chromatic confocal system 10 moves along the Z axis 70 to a third height. At the third height, the exposure of the color camera 40 is again activated 72 and a third image is captured 74 while the pinhole array 26 is shifted along the direction of motion 52.

While the third captured image is being transferred to the processor, the chromatic confocal system 10 moves along the XY plane 76 to inspect another position on the object. Again, the chromatic confocal system 10 will capture another three separate images of the object 12 at different heights. This will continue until images of a whole surface of the object 12 to be inspected have been captured.

Figure 10:
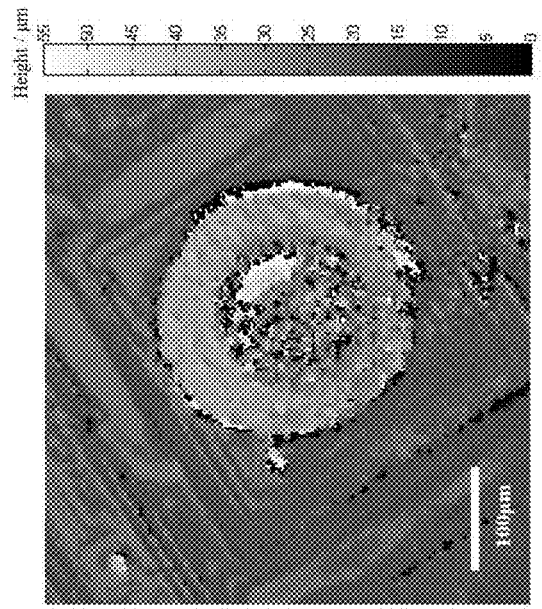
FIG. 10 is a reconstructed image after processing by the chromatic confocal system.

FIG. 10 is a reconstructed image after processing by the chromatic confocal system 10. A three-dimensional profile of a wire-bonded ball with a thickness of about 15 μm has been imaged by the chromatic confocal system 10 in accordance with the preferred embodiment of the invention, during which separate images have been captured of the wire-bonded ball at three different height levels. Based on this reconstructed image, the surface profile of the wire-bonded ball can be accurately determined.

This invention thus describes a chromatic confocal system 10 that incorporates a designed light source with modulated spectral amplitudes or waveforms. Depth information is calculated from differentials of the RGB intensity response of the color camera 40 obtained at each measured point on the captured image, such that the effect of stray light rays in the system can be largely avoided.

It should be appreciated that the chromatic confocal system 10 in accordance with the preferred embodiment of the invention requires only a standard color camera 40 instead of a spectrometer for depth calculation. Therefore, only a limited number of pinholes 50 on the pinhole array 26 need to be used for each image captured, since the pinholes 50 can be shifted to reveal different contiguous portions of the object 12 to make up the whole. The described apparatus allows full area imaging for each image that is captured. This means that X-Y scanning is realizable by scanning via moving the pinhole array 26, without having to move the rest of the optical system or the object 12, even for scanning a whole surface area of the object that is within a field of view of the color camera 40.

Further, the said chromatic confocal system 10 modulates the spectrum of the light source to enhance the perceived height resolution. It is thus possible to compute depth information from variations in the light intensity responses obtained from multiple images by either illuminating the object with selected lighting assemblies sequentially, capturing confocal images at different predetermined heights, or by rotating a Lyot filter 18. This is useful for avoiding the errors introduced by stray and out-of-focus light rays, and hence leads to higher accuracy.

The invention described herein is susceptible to variations, modifications and/or additions other than those specifically described and it is to be understood that the invention includes all such variations, modifications and/or additions which fall within the spirit and scope of the above description.

The invention claimed is:

1. Method of scanning a surface of an object using a confocal imaging system, comprising the steps of:
    obtaining first, second and third confocal images of the surface of the object when the object is illuminated respectively by light rays having first, second and third spectral waveforms;
    using a camera to capture responsive signals from the object illuminated by the first, second and third spectral waveforms; and thereafter
    determining heights of a plurality of points on the surface of the object corresponding to the plurality of points on each confocal image based on said captured responsive signals;
    wherein the first, second and third spectral waveforms are distinguishable from one another and each spectral waveform has overlapping portions relative to another spectral waveform.

2. Method as claimed in claim 1, wherein the responsive signals comprise an intensity spectrum of light rays reflected from the surface of the object that are received by the camera.

3. Method as claimed in claim 2, further comprising the step of calibration wherein first, second and third confocal images are obtained of a flat surface when the flat surface is illuminated respectively by light rays having the first, second and third spectral waveforms from various heights of the confocal imaging system relative to the flat surface, prior to scanning the surface of the object.

4. Method as claimed in claim 2, wherein the intensity spectrum corresponds to an RGB intensity response of the camera obtained at each measured point on the captured confocal image.

5. Method as claimed in claim 1, wherein the step of illuminating the object with light rays having the first, second and third spectral waveforms comprises the step of modulating the light rays produced by the light source to generate the respective spectral waveforms.

6. Method as claimed in claim 5, wherein the light rays are modulated by a Lyot filter when the light rays are passed through the Lyot filter prior to illuminating the object.

7. Method as claimed in claim 6, wherein the step of modulating the light rays further comprises the step of rotating a quartz plate relative to first and second linear polarizers about an axis which is transverse to a travel direction of the light rays through the Lyot filter, wherein the quartz plate is positioned between the first and second linear polarizers.

8. Method as claimed in claim 1, wherein the light source comprises first, second and third lighting assemblies which produce the first, second and third spectral waveforms for illuminating the object sequentially.

9. Method as claimed in claim 8, wherein the light rays produced from the first, second and third lighting assemblies are received through a single optical filter for transmission onto the object.

10. Method as claimed in claim 1, wherein the first, second and third confocal images are captured at different heights of the confocal imaging system relative to the object for producing the first, second and third spectral waveforms to illuminate the object.

11. Method as claimed in claim 1, further comprising the step of passing the light rays through a pinhole array and shifting the pinhole array in a direction of motion which is traverse to a travelling direction of the light rays during capturing of the confocal images.

12. Method as claimed in claim 11, wherein the pinhole array comprises a matrix of individual pinholes that are rotated at an angle to the direction of motion of the pinhole array.

13. Method as claimed in claim 11, wherein each confocal image is captured by activating an exposure of the camera while shifting the pinhole array in the direction of motion to capture a confocal image of a contiguous area of the object.

14. Method as claimed in claim 1, wherein the camera comprises a color camera.

15. A confocal imaging system for scanning a surface of an object, comprising:
   first, second and third lighting assemblies operative to produce light rays having first, second and third spectral waveforms for illuminating the object;
   a camera for capturing first, second and third confocal images of the surface of the object that are indicative of responsive signals from the surface of the object when the object is illuminated respectively by the light rays having the first, second and third spectral waveforms;
   a processor for determining the heights of a plurality of points on the surface of the object corresponding to the plurality of points on each confocal image based on said captured responsive signals;
   wherein the first, second and third spectral waveforms are distinguishable from one another and each spectral waveform has overlapping portions relative to another spectral waveform.

16. A confocal imaging system for scanning a surface of an object, comprising:
   a modulating filter assembly operative to modulate light rays generated from a light source to produce light rays having first, second and third spectral waveforms for illuminating the object;
   a camera for capturing first, second and third confocal images of the surface of the object that are indicative of responsive signals from the surface of the object when the object is illuminated respectively by the light rays having the first, second and third spectral waveforms;
   a processor for determining the heights of a plurality of points on the surface of the object corresponding to the plurality of points on each confocal image based on said captured responsive signals;
   wherein the first, second and third spectral waveforms are distinguishable from one another and each spectral waveform has overlapping portions relative to another spectral waveform.

* * * * *